(12) United States Patent
Sarles et al.

(10) Patent No.: US 6,411,483 B1
(45) Date of Patent: Jun. 25, 2002

(54) HICCUP-MODE CURRENT PROTECTION CIRCUIT FOR SWITCHING REGULATOR

(75) Inventors: F. Williams Sarles, Lexington, MA (US); John DeGregorio, Dover, NH (US)

(73) Assignee: Enterasys Networks, Inc., Portsmouth, NH (US)

(*) Notice: Subject to any disclaimer, the term of this patent is extended or adjusted under 35 U.S.C. 154(b) by 0 days.

(21) Appl. No.: 09/449,438

(22) Filed: Nov. 24, 1999

(51) Int. Cl.[7] .............................................. H02H 3/00
(52) U.S. Cl. ...................................... 361/93.4; 361/18
(58) Field of Search .......................... 361/93.1, 87, 89, 361/93.4, 93.6, 93.7, 18, 92; 323/276, 282, 284, 313, 908

(56) References Cited

U.S. PATENT DOCUMENTS

| | | | | |
|---|---|---|---|---|
| 4,481,553 A | * | 11/1984 | Owen et al. | 361/93.1 |
| 5,917,690 A | * | 6/1999 | Anderson | 361/87 |
| 6,057,998 A | * | 5/2000 | Sakamoto et al. | 361/78 |
| 6,094,362 A | * | 7/2000 | Domingo | 363/21 |
| 6,118,642 A | * | 9/2000 | Benenati et al. | 361/89 |
| 6,130,813 A | * | 10/2000 | Kates et al. | 361/93.1 |

* cited by examiner

*Primary Examiner*—Ronald W. Leja
(74) *Attorney, Agent, or Firm*—Devine, Millimet & Branch, P.A.; Paul C. Remus; Todd A. Sullivan

(57) ABSTRACT

A hiccup mode current protection circuit for switched mode power converters for high power applications is provided. The circuit features a comparator for comparing an indicating voltage to a reference voltage and outputting a control signal to a disabling input where the indicating voltage exceeds a predetermined voltage threshold. The control signal also causes a switch to reduce the reference voltage to ensure that the comparator continues to output the control signal regardless of a drop in the indicating voltage. The control signal is maintained by a comparator for only a predetermined time period such that the switch eventually returns the reference voltage to its pre-reduction state, allowing the comparator to discontinue outputting the control signal if the indicating voltage is below the predetermined voltage threshold.

17 Claims, 4 Drawing Sheets

HICCUP-MODE CURRENT PROTECTION CIRCUIT FOR SWITCHING REGULATOR

FIELD OF THE INVENTION

This invention relates to the field of power conditioning systems. More specifically, to power supply current protection systems that function in the hiccup mode. Even more specifically, to hiccup-mode current protection systems employed by switched mode power converters.

BACKGROUND OF THE INVENTION

Limiting of power supply output current or power under load fault conditions is a protective feature designed into many of today's power conditioning equipment. Common methods to accomplish this usually fall into one of three classifications.

Constant current limiting prevents increases in current beyond a predetermined load current, Imax. Subsequent decreases in load impedance result in decreased output voltage with the output current being maintained at approximately Imax. With many types of switching regulators, constant current limiting is easily implemented using cycle-to-cycle peak current limiting.

Foldback current limiting causes the output current to decrease with any further decrease in the load impedance once the load current reaches Imax. Foldback limiting was originally developed to prevent thermal damage to output power devices in linear regulated power supplies. This concept has been applied to switching regulators, but can be both overly complex and unstable for many applications and does not offer advantages over hiccup mode current limiting.

Hiccup mode current limiting shuts down the power supply for a predetermined delay period when the current reaches Imax. If Imax occurs again, the shutdown and restart process repeats. With the proper design, hiccup design can be very effective at protecting both internal and external components and circuitry from thermal and overload damage.

For high power designs of a kilowatt or more, hiccup mode presents the best alternative of these three designs. Constant current limiting can be hazardous in these applications. If a constant current limit were set at 40 amperes and the load fault impedance were such as to drag the output voltage down to 25 volts, 1000 watts of power would be dissipated in this "semi short." This is an unacceptable result that could cause a fire. Hiccup mode, properly designed, will deliver only a few watts of average power into a fault and is superior for high power designs.

Previous designs for current protection circuits using the hiccup mode, do not address the specific needs of a power supply environment. See Owen, et al., U.S. Pat. No. 4,481,553. Owen, et al. is incorporated herein by this reference. The Owen design is inferior for a power supply because it is designed to function in a power amplification environment and therefore does not provide the requisite high efficiency needed in the power supply environment. Further, and even more critical, the Owen circuit is designed to output a zero voltage once a high current condition is detected. This design feature does not disable the circuit from delivering current during a high current state because the design still functions as an active power amplifier. This result is not useful in a power environment where numerous redundant power supples may be connected in parallel.

What is needed is a hiccup-mode current protection circuit for switched mode power converters for high power applications that overcomes the deficiencies of the prior art designs.

SUMMARY OF THE INVENTION

It is therefore an object of this invention to provide a hiccup mode current protection circuit for switched mode power converters for high power applications.

This invention features an overcurrent protection circuit with a comparator for comparing an indicating voltage to a reference voltage and outputting a control signal to a disabling input where the indicating voltage exceeds a predetermined voltage threshold. The control signal also causes a switch to reduce the reference voltage to ensure that the comparator continues to output the control signal regardless of a drop in the indicating voltage. The control signal is maintained by a comparator for only a predetermined time period such that the switch eventually returns the reference voltage to its pre-reduction state, allowing the comparator to discontinue outputting the control signal if the indicating voltage is below the predetermined voltage threshold.

Brief Description of the Drawings

The novel features believed characteristic of the invention are set forth in the appended claims. The invention itself however, as well as other features and advantages thereof, will be best understood by reference to the description which follows, read in conjunction with the accompanying drawings, wherein:

Detailed Description of the Invention

Figure 1:
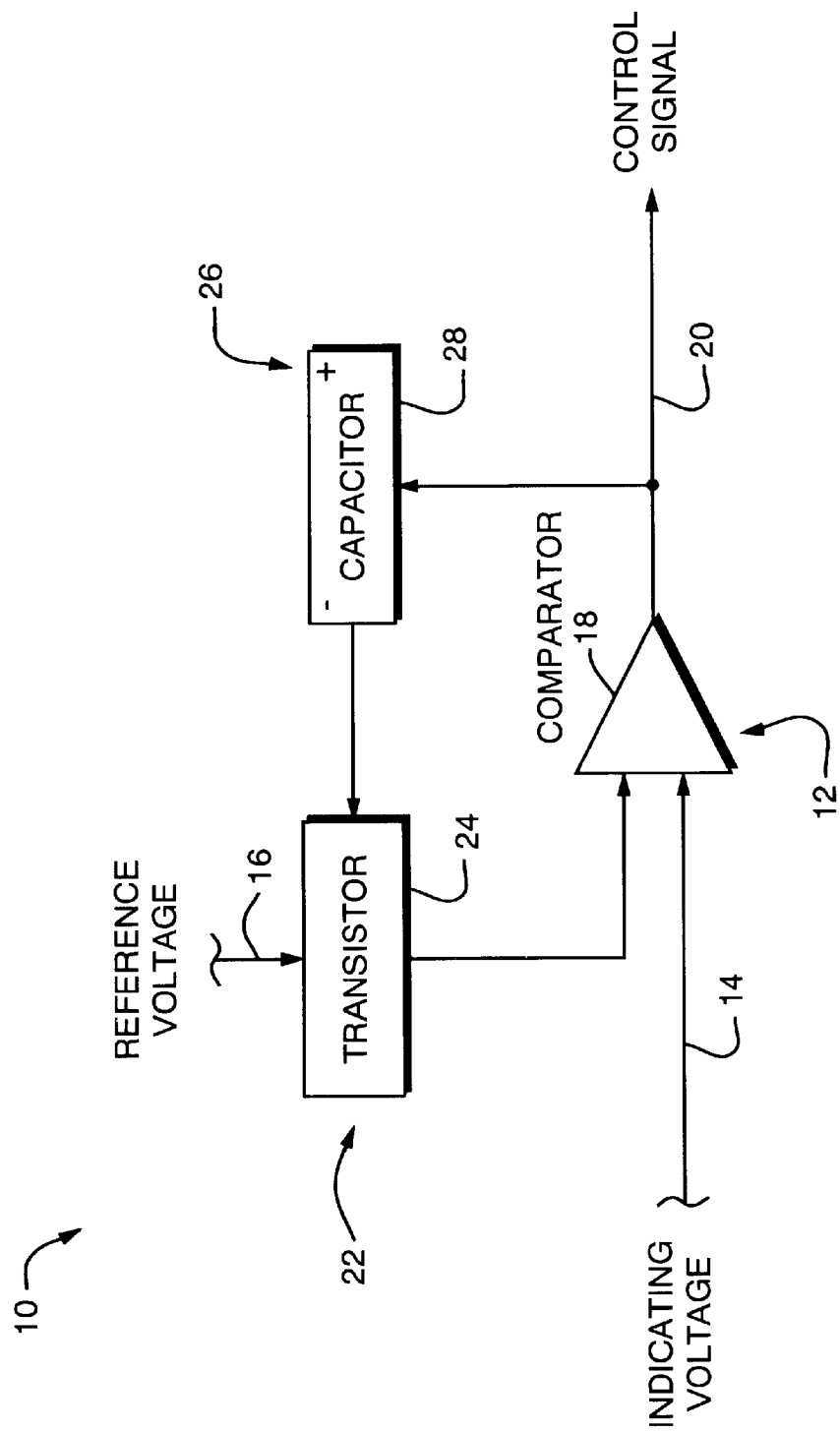
FIG. 1 shows a block diagram that illustrates one embodiment of this invention.

There is shown in FIG. 1 a block diagram illustrating one embodiment of this invention. This invention is designed to be used in a power conditioning apparatus that utilizes a switching regulator and incorporates a means for producing an indicating voltage corresponding to the magnitude of the input current. The typical use of a current transformer to generate an indicating voltage is not new, and other methods of generating such a voltage are contemplated by this invention. The power conditioning apparatus also must have a reference voltage and a means for disabling the apparatus. Typically a controller chip is utilized with a disabling input that will suffice as a disabling device, but other methods known in the art are also contemplated.

The overcurrent protection circuit 10 comprises comparison means 12 for comparing indicating voltage 14 to a signal corresponding to reference voltage 16. Comparator 18 may be used as comparison means 12, as well as other devices and device combinations known in the art to accomplish a voltage comparison function. Comparison means 12 outputs control signal 20 to the disabling means when the indicating voltage exceeds a predetermined voltage threshold corresponding to a maximum current trip setpoint.

Overcurrent protection circuit 10 further comprises switching means 22 for reducing reference voltage signal 16 received by comparison means 12 in response to the presence of control signal 20 from comparison means 12. One embodiment of the present invention uses transistor 24 as switching means 22. Reference voltage signal 16 is reduced to a predetermined voltage threshold sufficient to ensure comparison means 12 continues to output control signal 20 to the disabling means regardless of the forthcoming drop in indicating voltage 14.

Finally, overcurrent protection circuit 10 comprises timeout means 26 for maintaining control signal 20 received by switching means 22 for only a predetermined time period such that switching means 22 eventually restores reference voltage signal 16 sent to comparison means 12 to its pre-reduction state. In a preferred embodiment, timeout means 26 comprises capacitor 28, but other means known in the art are also contemplated. The subsequent removal of control signal 20 from switching means 22 allows comparison means 12 to discontinue outputting control signal 20 to the disabling means if indicating voltage 14 is below the predetermined voltage threshold corresponding to a maximum current trip setpoint.

Figure 2:
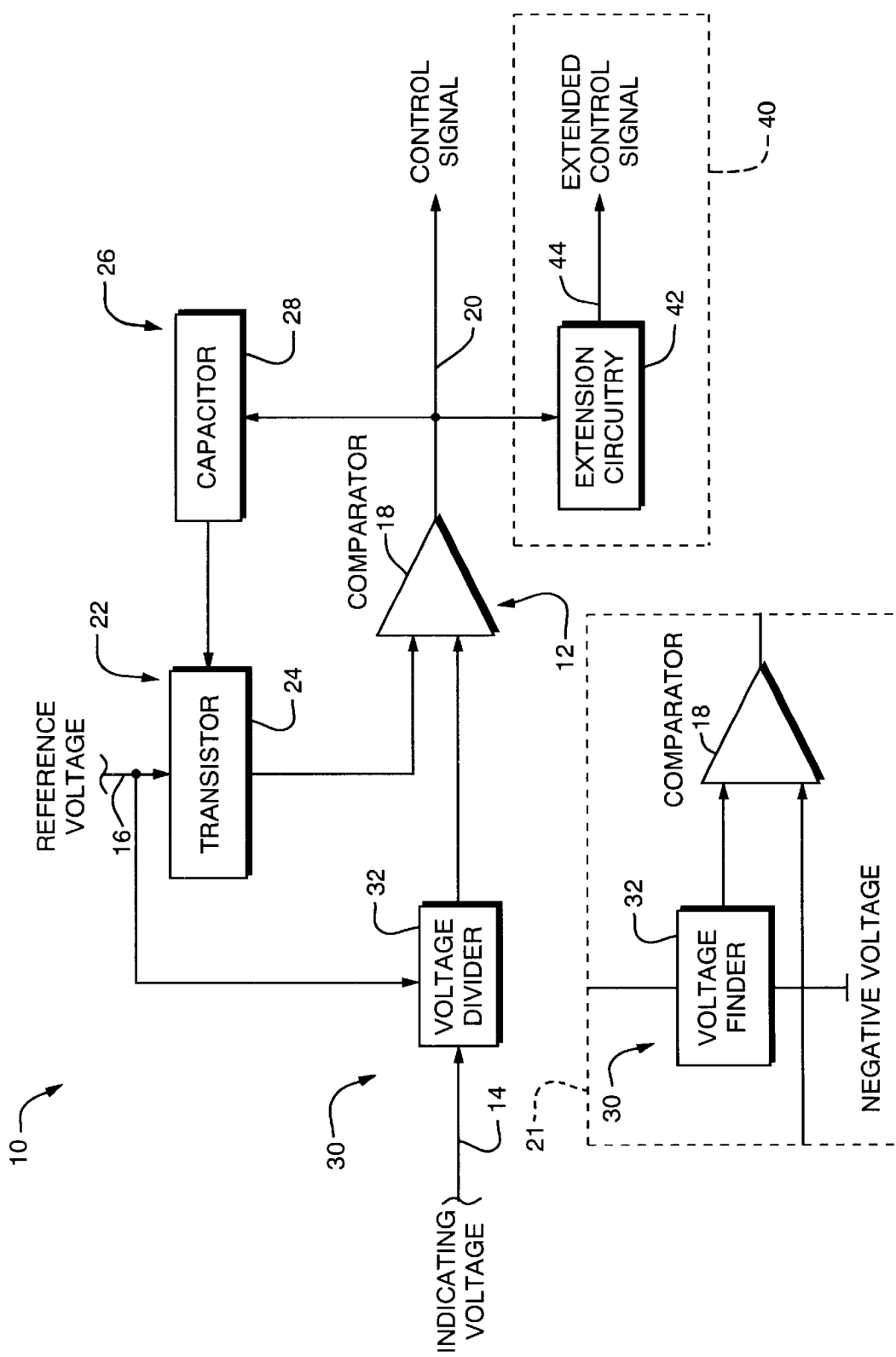
FIG. 2 is another block diagram that illustrates another embodiment of this invention.

FIG. 2 illustrates another embodiment of this invention. This embodiment further comprises offset means 30 for adding a positive offset to indicating voltage 14. In a preferred embodiment, offset means 30 comprises voltage divider circuit 32 coupled to reference voltage 16. An alternative embodiment 21 uses a negative voltage with offset means 30 for adding a negative offset to reference voltage 16. In a preferred alternate embodiment, biasing means 30 comprises voltage divider circuit 30 coupled to the negative voltage source. The function of offset means 30 is to ensure that indicating voltage 14 as received by comparison means 12 remains greater than the signal received at the other input terminal to comparison means 12 when switching means 22 reduces reference voltage signal 16 in response to the presence of control signal 20. This ensures that control signal 20 continues to be output from overcurrent protection circuit 10 until switching means 22 returns to a state allowing comparison means 12 to receive reference voltage 16. This design ensures that once a high current trip has initiated, subsequent reductions in indicating voltage 14 do not interrupt the hiccup mode cycle.

Additionally, this embodiment may include pulse extension means 40 to extend control signal 20. In an embodiment employing discharge of capacitor 28 for the hiccup mode timeout delay, some additional time will be necessary for the capacitor to recharge and thus reestablish initial conditions. If this is not provided for in the pulse width modulation (hereafter "PWM") control chip startup circuitry, it can be accommodated as shown in means 40. Here the onset of extended control signal 44 coincides with that of control signal 20. However, removal of modified control signal 44 occurs at some predetermined delay following the cessation of control signal 20, thereby ensuring sufficient time for capacitor 28 to reinitialize.

Figure 3:
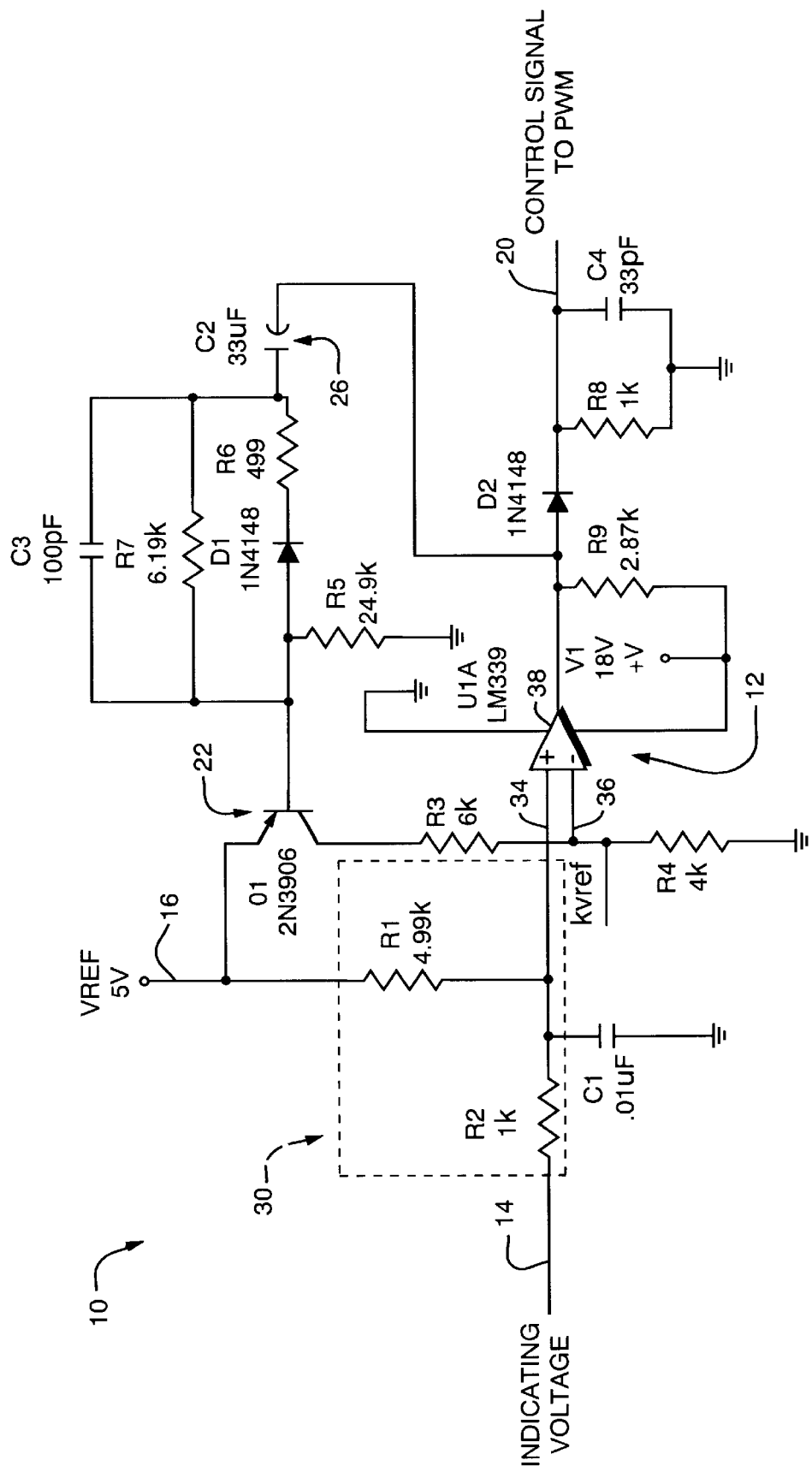
FIG. 3 is a circuit schematic diagram that illustrates one preferred embodiment of this invention.

FIG. 3 shows an embodiment of the present invention used to supply a control signal to a PWM control chip. It should be noted that this specific embodiment and elements of it are not proposed as a limitations, but only as one embodiment of the invention. The invention can be applied in principle to any switching regulator that has rapid shutdown capability.

In this embodiment, comparison means 12 comprises comparator U1A having an open NPN collector output 38. Output 38 of comparator U1A comprises positive voltage source V1 and pull-up resistor R9, positive voltage source V1 being coupled to NPN collector output 38 through pull-up resistor R9.

Comparator U1A further comprises positive and negative input terminals with positive terminal 34 receiving the result of applying indicating voltage 14 across offset means 30.

Offset means 30 comprises the voltage divider of resistor R1 and R2. Negative terminal 36 of comparator U1A receives a signal corresponding to reference voltage 16, or Vref, when transistor 22 is conducting.

In this embodiment, switching means 22 is PNP transistor Q1. Transistor Q1's emitter is electrically coupled to voltage reference 16, or Vref. Transistor Q1's base is electrically coupled through a network to comparator U1A's output 38. Transistor Q1's collector is electrically coupled to comparison means 12, in this case negative terminal 36 of comparator U1A through the voltage divider of resistor R3 and resistor R4.

The overcurrent detection circuit 10 works as follows. The circuit has two basic states: a quiescent stable state, (hereafter "State 1") when no overcurrent condition exists, and a monostable state, (hereafter "State 2") which is triggered when the indicating voltage exceeds a predetermined threshold voltage corresponding to a high current condition.

During State 1, transistor Q1 is conducting and held in saturation by base current supplied through resistor R5. Consequently, the collector of transistor Q1 is within a few tens of millivolts of Vref (+5 volts), so the minus input of comparator U1A is maintained at kVref (~+2 volts), where k is the voltage divider ratio provided by resistor R3 and resistor R4. Since the input currents of comparator U1A are negligible, the threshold for overcurrent protection will occur when the plus input of comparator U1A is also at kVref, at which condition circuit analysis shows that the indicating voltage must be (neglecting time constant effects):

$$Vref[k-(1-k)(R2/R1)].$$

For the circuit values shown in FIG. 3, the indicating voltage threshold is +1.4 volts. Since in State I the indicating voltage is less than this value, comparator U1A's output (open collector for an LM339 comparator) is at ground (0 volts), and capacitor C2 is charged to about +4 volts. The output from diode D2's cathode supplies the control signal to the PWM, and is also at zero (0) volts.

When the indicating voltage input exceeds the threshold defined above, the circuit undergoes a transition to State 2. As comparator U1A's plus input becomes positive with respect to the minus input, comparator U1A's output, an open NPN collector, begins to turn off. Note that we can treat the resistor/diode network load of resistor R8, diode D2 and resistor R9 fed by voltage V1, at comparator U1A's output as a Thevenin equivalent circuit having a 5.2 volt source with a 740 Ohm series resistance. The ensuing positive-going voltage change at comparator U1A's output is coupled by capacitor C2 through resistor R7 to the base of transistor Q1. As transistor Q1 starts to turn off, the voltage at comparator U1A's minus input begins to decrease. The consequent positive regenerative feedback path, with capacitor C3 as a speedup capacitor, rapidly completes the transition to State 2.

Upon entering State 2, the loading of resistor R5 plus resistor R7 on the Thevenin equivalent circuit defined above is negligible. The voltage at the positive terminal of capacitor C2 will be the sum of the equivalent voltage source plus the stored voltage on capacitor C2, which is a value of about 9.2 volts for the circuit as shown. The voltage division from resistor R5 and resistor R7 applies a slightly lesser voltage to the base of transistor Q1, in this case about 7.4 volts. Note that with transistor Q1 turned off, comparator U1A's minus input is at zero (0) volts, while its plus input cannot be less than Vref[R2/(R1+R2)]. The circuit will remain in State 2 until transistor Q1 begins to turn on. This will occur when the voltage on capacitor C2 has discharged to a value such that the voltage at the base of transistor Q1 is about 4.5 volts.

The duration of State 2 is dependent on the time constant (R5+R7)C2. Denoting this time constant as T, the Thevenin equivalent voltage as Veq, the initial capacitor C2 voltage as Vco, and the voltage at the base of transistor Q1 as Vqb, the time duration of State 2 is given by:

$$T \ln[\{Veq+Vco\}/\{Vqb(1+\{R7/R5\})\}].$$

For the values shown in FIG. 3, the duration of State 2 is approximately 500 milliseconds.

Note that once the overcurrent threshold is exceeded and the regenerative feedback action is initiated, a subsequent decrease in the indicating voltage will not halt the transition to State 2. Hence, the voltage across resistor R8 and therefore the control signal to PWM will be rapidly driven to 4.5 volts, thereby shutting down the PWM drive. Additional control functions can be derived from this point or from comparator U1A's output for ancillary circuit control. Note that PWM shutdown will cause the indicating voltage to drop to zero.

When capacitor C2 has discharged sufficiently so that transistor Q1 begins to conduct, the voltage on comparator U1A's minus input will begin to increase. When this voltage equals that on the plus input to comparator U1A, comparator U1A's open collector output will begin to conduct, pulling down on the negative terminal of capacitor C2. At this point, the positive regenerative path again becomes active, rapidly turning on transistor Q1 and pulling the output of comparator U1A to zero (0) volts. The voltage at diode D2's cathode therefore becomes zero, permitting the PWM to enter its soft start turn-on. Also at this time, capacitor C2 begins recharging through resistor R6, diode D1 and the base of transistor Q1. The time constant of this recharge should be no greater than about one-fourth that of the PWM soft start time so that this circuitry will be adequately recovered when the power stage is reactivated.

Figure 4:
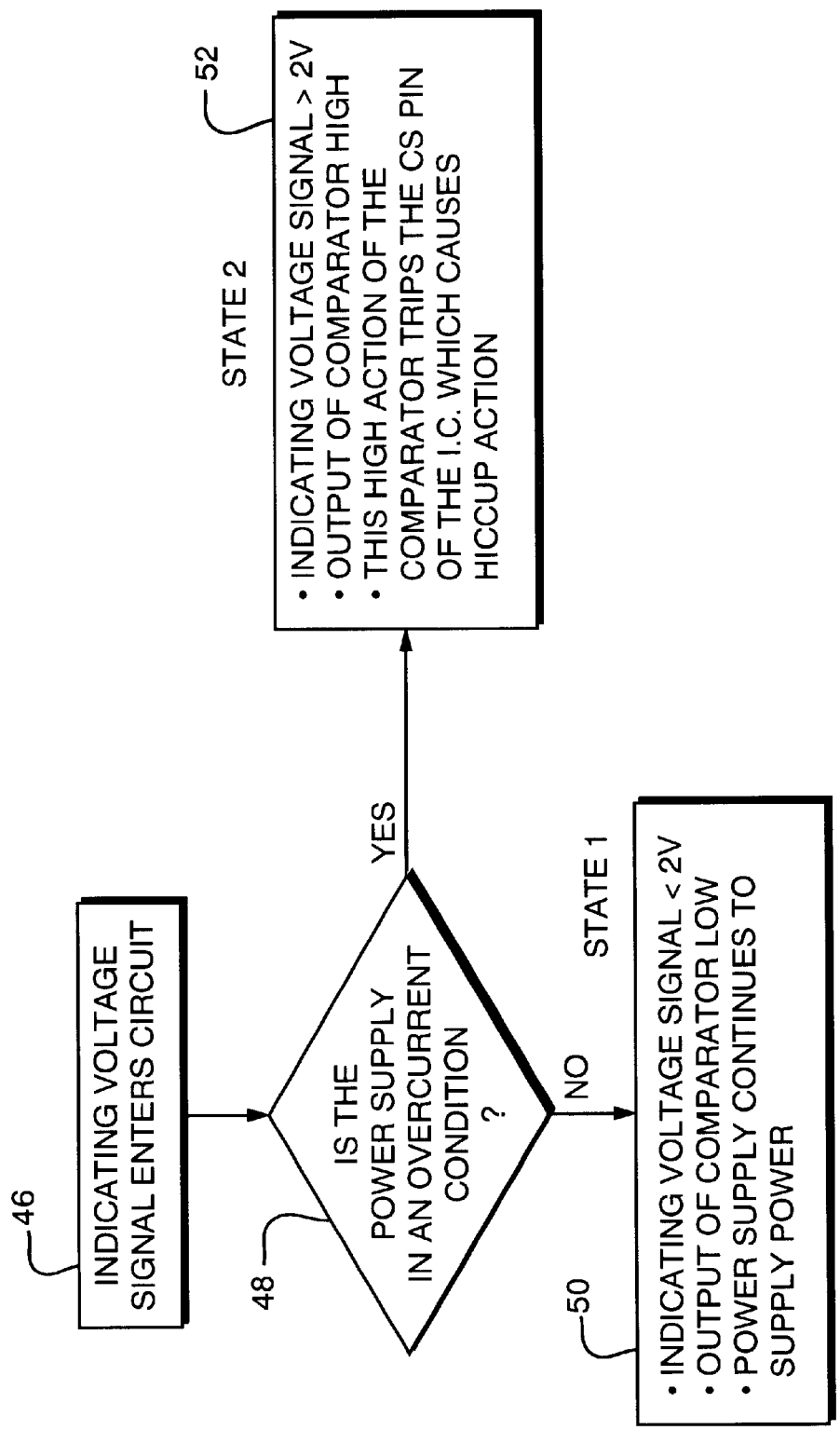
FIG. 4 is a flow diagram that illustrates the basic operation of one embodiment of the invention.

FIG. 4 is a flow diagram that illustrates the basic operation of one embodiment of this invention. As stated above, the circuit has two basic states: a quiescent stable state, or State 1, when no overcurrent condition exists, and a monostable state, or State 2, which is triggered when the sensed current exceeds a predetermined threshold current.

The circuit function begins when the indicating voltage signal enters the circuit, represented by block 46. The circuit then makes a determination of whether the power supply is in an overcurrent condition, represented by block 48. Depending on this determination, the circuit enters one of its two states. The circuit enters State 1 if the indicating voltage is below threshold voltage, in this case 2 volts. State 1 is represented by block 50 in the figure. In State 1, the output of the comparator is low and this output enables the controller to continue to supply power.

If the circuit determines that an overcurrent condition exists, the circuit enters State 2. This state is represented by block 52 in the figure. In State 2, the indicating voltage is below the voltage threshold, in this case 2 volts. The output of the comparator is high and this high signal has two effects. First, the high signal trips off the controller. Second, the high signal causes the hiccup action within the circuit. The hiccup action continues the disabling signal for a predetermined length of time before discontinuing the signal and allowing the controller to initiate a soft-start.

We claim:

1. In a power conditioning apparatus utilizing a switching regulator, the apparatus having a reference voltage, a means for producing an indicating voltage corresponding to the magnitude of the input current and means for disabling the apparatus, an overcurrent protection circuit comprising:
    a comparison means for comparing the indicating voltage to a signal corresponding to the reference voltage and outputting a control signal to the disabling means when the indicating voltage exceeds a predetermined voltage threshold corresponding to a maximum current trip setpoint;
    a switching means for reducing the reference voltage signal received by the comparison means in response to the presence of the control signal from the comparison means, the reference voltage signal reduced to a predetermined voltage threshold to ensure the comparison means continues to output a control signal to the disabling means regardless of the forthcoming drop in the indicating voltage; and
    a timeout means for maintaining the control signal received by the switching means for only a predetermined time period such that the switching means eventually restores the reference voltage signal sent to the comparison means to its pre-reduction state, thereby allowing the comparison means to discontinue outputting the control signal to the disabling means if the indicating voltage is below the predetermined voltage threshold corresponding to the maximum current trip setpoint.

2. The overcurrent protection circuit of claim 1 wherein the comparison means comprises a comparator.

3. The overcurrent protection circuit of claim 2 wherein the comparator further comprises an open NPN collector output.

4. The overcurrent protection circuit of claim 3 wherein the comparator further comprises positive and negative input terminals, the positive terminal receiving the indicating voltage and the negative terminal receiving the signal corresponding to the reference voltage.

5. The overcurrent protection circuit of claim 3 further comprising a positive voltage source and a pull-up resistor, the positive voltage source coupled to the NPN collector output through the pull-up resistor.

6. The overcurrent protection circuit of claim 1 wherein the switching means comprises a transistor.

7. The overcurrent protection circuit of claim 6 wherein the transistor is a PNP transistor.

8. The overcurrent protection circuit of claim 7 wherein the PNP transistor's emitter is electrically coupled to a source of the reference voltage, the transistor's base is electrically coupled to the output of the comparison means and the transistor's collector is electrically coupled to the comparison means.

9. The overcurrent protection circuit of claim 8 further including a voltage divider circuit between the transistor's collector and the comparison means.

10. The overcurrent protection circuit of claim 1 wherein the timeout means comprises a capacitor.

11. The overcurrent protection circuit of claim 10 further including a voltage divider circuit between the capacitor and the switching means.

12. The overcurrent protection circuit of claim 1 further comprising an offset means for raising the indicating voltage above a predetermined voltage threshold.

13. The overcurrent protection circuit of claim 12 wherein the offset means comprises a voltage divider circuit coupled to the reference voltage.

14. The overcurrent protection circuit of claim 1 further comprising a negative voltage source and an offset means for lowering the reference voltage signal below a predetermined voltage.

15. The overcurrent protection circuit of claim 14 wherein the biasing means comprises a voltage divider circuit coupled to the negative voltage source.

16. In a power conditioning apparatus utilizing a switching regulator, the apparatus having a reference voltage, an indicating voltage corresponding to the magnitude of an input current and a disabling input to a controller, an overcurrent protection circuit comprising:

- a comparator for comparing the indicating voltage to a signal corresponding to the reference voltage and outputting a control signal to the disabling input when the indicating voltage exceeds a predetermined voltage threshold corresponding to a maximum current trip setpoint;
- a switch for reducing the reference voltage signal received by the comparator in response to the presence of the control signal from the comparator, the reference voltage signal reduced to a predetermined voltage threshold to ensure the comparator continues to output a control signal to the disabling input regardless of the forthcoming drop in the indicating voltage; and
- a capacitor for maintaining the control signal received by the switch for only a predetermined time period such that the switch eventually restores the reference voltage signal sent to the comparator to its pre-reduction state, thereby allowing the comparator to discontinue outputting the control signal to the disabling input if the indicating voltage is below the predetermined voltage threshold corresponding to the maximum current trip setpoint.

17. An overcurrent protection circuit comprising:

- a comparator for comparing a current indicating voltage to a reference voltage signal and outputting a control signal when the indicating voltage exceeds a predetermined voltage threshold corresponding to a maximum current trip setpoint;
- a switch for reducing the reference voltage signal in response to the presence of the control signal, the reference voltage signal reduced to a predetermined voltage threshold to ensure the comparator continues to output a control signal regardless of any drop in the current indicating voltage; and
- a capacitor electrically coupled between the comparator output and the switch to transmit the control signal for a limited duration.

\* \* \* \* \*